(12) United States Patent
Otis et al.

(10) Patent No.: US 10,242,384 B2
(45) Date of Patent: *Mar. 26, 2019

(54) METHOD AND SYSTEM FOR LOCATION-BASED PRODUCT RECOMMENDATION

(71) Applicant: Target Brands, Inc., Minneapolis, MN (US)

(72) Inventors: Collin Otis, Turtle Creek, PA (US); Joshua Barrett Strausser, Turtle Creek, PA (US)

(73) Assignee: Target Brands, Inc., Minneapolis, MN (US)

( * ) Notice: Subject to any disclaimer, the term of this patent is extended or adjusted under 35 U.S.C. 154(b) by 874 days.

This patent is subject to a terminal disclaimer.

(21) Appl. No.: 14/750,468

(22) Filed: Jun. 25, 2015

(65) Prior Publication Data

US 2015/0379576 A1 Dec. 31, 2015

Related U.S. Application Data

(60) Provisional application No. 62/017,029, filed on Jun. 25, 2014.

(51) Int. Cl.
*G06Q 30/02* (2012.01)
*H04W 4/021* (2018.01)

(52) U.S. Cl.
CPC ..... *G06Q 30/0261* (2013.01); *G06Q 30/0217* (2013.01); *G06Q 30/0255* (2013.01); *G06Q 30/0267* (2013.01); *G06Q 30/0277* (2013.01); *H04W 4/021* (2013.01)

(58) Field of Classification Search
CPC ................................. G06Q 30/0207–30/0277
USPC .............................................. 705/14.1–14.73
See application file for complete search history.

(56) References Cited

U.S. PATENT DOCUMENTS

| 8,050,984 | B2 | 11/2011 | Bonner et al. | |
|---|---|---|---|---|
| 2009/0286548 | A1 | 11/2009 | Coronel et al. | |
| 2013/0103608 | A1 | 4/2013 | Scipioni et al. | |
| 2014/0279014 | A1* | 9/2014 | Roka | G06Q 30/0261 705/14.58 |
| 2015/0054620 | A1* | 2/2015 | Graube | G06K 7/10009 340/10.1 |

* cited by examiner

*Primary Examiner* — Sam Refai
(74) *Attorney, Agent, or Firm* — Shumaker & Sieffert, P.A.

(57) ABSTRACT

A location-based product recommendation system uses consumer profile data, a network of beacons that emit unique identifiers, and a recommender to determine current product-correlated location information for a space in which a consumer's mobile device is physically present. The system may use the current product-correlated location information and the consumer's profile data to generate a recommendation for a candidate product for the consumer to consider. The system also may incorporate data from other interactions with products such as purchases, clicks on a website, etc. The system also may incorporate data generated on multiple channels (e.g., a product click on a personal computer at work, a mobile device location in a physical store, a product purchase on a personal computer in the home) into a single profile for the consumer.

19 Claims, 6 Drawing Sheets

METHOD AND SYSTEM FOR LOCATION-BASED PRODUCT RECOMMENDATION

This application claims the benefit of U.S. Provisional Patent Application No. 62/017,029, filed Jun. 25, 2014, the entire content of which is incorporated by reference.

BACKGROUND

Commercial property owners and operators, as well as the manufacturers of products sold in those properties, present many marketing messages to consumers within the property. The messages may be in the form of signs, audio messages, and video screens. However, these messages are not personal to the consumer, and they require manual labor and scheduling to change as the property's layout and content changes.

To continue to engage consumers who visit commercial properties, many property operators often change the property's layout in order to keep the consumer experience exciting and fresh. For example, retail stores often rotate various products in and out of inventory, such as may happen when a seller of clothing rotates styles and seasonal clothing in and out based on current consumer tastes. A grocery store may move certain products to an end cap of an aisle for promotional purposes for a limited period of time. Other commercial properties change their layout by necessity. For example, the layout of a convention facility or conference center may change depending on the particular event the property is hosting at the time.

On the Internet, product recommendations based on online browsing behavior have proven to be useful for shoppers to find the right product they are searching for and to discover new products they are interested in, but did not previously know existed. When a shopper shops in a physical store, she does not have access to product recommendations based on her physical and digital shopping behaviors, thus losing the convenience of product recommendations. Product recommendations have been proven to increase purchase conversion and average order value. Therefore, retailers may miss out on revenue due to a lack of ability to provide in-store product recommendations.

In each of these cases, when the facility operator changes the layout, the operator must also physically change the in-facility marketing messages, such as signs and other advertisements. This process is time-consuming and is not personalized to any individual consumer who enters the facility.

SUMMARY

In an example, a location-based product recommendation system includes a data set of profile data for a plurality of consumers. A server contains programming instructions that, when executed, cause a processor to receive a communication from a mobile device associated with a particular consumer. The communication includes current product-correlated location information for a space in which the device is physically present. The instructions cause the processor to access the profile data for the particular consumer; use the current product-correlated location information and the profile data for the particular consumer to generate a recommendation for a candidate product for the particular consumer to consider; and transmit a message to the mobile device that, when viewed, causes the mobile device to output the recommendation for the candidate product to the particular consumer.

Optionally, the current product-correlated location information includes data representing one or more identifiers for one or more beacons in the space, along with a modeled location of an item proximate one or more of the beacons in the space. If so, then using the current product-correlated location information to generate the recommendation the system may select, as the candidate product, a product corresponding to the item.

Optionally, the current product-correlated location information may include data representing one or more identifiers for one or more beacons in the space, along with a modeled location of an item proximate one or more of the beacons in the space. The profile data for each consumer may include one or more of the following: prior consumption activity data of the consumer; online browsing activity data of the consumer; or prior product-correlated location information for the consumer when the consumer was in a retail space. When using the current product-correlated location information and the profile data to generate the recommendation, the system may select, as the candidate product, a product corresponding to both the item and a data point in the profile data for the particular consumer.

In another example, this disclosure describes a method comprises receiving, by a computing system comprising one or more computing devices, a plurality of signal strength vectors, each respective signal strength vector of the plurality of signal strength vectors comprising respective indications of signal strengths, as detected by a mobile device of a plurality of mobile devices, of signals emitted by a plurality of beacons located within a physical space; receiving, by the computing system, a plurality of content identifiers, each respective content identifier of the plurality of content identifiers identifying content accessed by a mobile device of the plurality of mobile devices, the content corresponding to an item among a plurality of items located within the physical space; generating, by the computing system, a point cloud comprising a plurality of points, wherein each respective point of the point cloud maps a respective content identifier of the plurality of content identifiers to a respective location within the physical space corresponding to a respective signal strength vector of the plurality of signal strength vectors; for each respective point of the point cloud: determining, by the computing system, a content identifier having a highest number of occurrences within a predetermined radius of the location of the respective point; and transforming, by the computing system, the determined content identifier to a category identifier for the location of the respective point, the category identifier identifying a category of items in the plurality of items; generating, by the computing system, based on the category identifier for a current location of a particular mobile device of the plurality of mobile devices and profile data for a particular consumer, a recommendation for a candidate product for the particular consumer to consider, the particular consumer being a user of the particular mobile device, the candidate product belonging to the category of items identified by the category identifier for the current location of the particular mobile device; and transmitting, by the computing system, a message that causes the particular mobile device to output the recommendation for the candidate product for display.

In another example, this disclosure describes a computing system comprising: one or more communication ports configured to: receive a plurality of signal strength vectors, each respective signal strength vector of the plurality of signal strength vectors comprising respective indications of signal strengths, as detected by a mobile device of a plurality of mobile devices, of signals emitted by a plurality of beacons located within a physical space; and receive a plurality of content identifiers, each respective content identifier of the plurality of content identifiers identifying content accessed by a mobile device of the plurality of mobile devices, the content corresponding to an item among a plurality of items located within the physical space; one or more processors configured to: generate a point cloud comprising a plurality of points, wherein each respective point of the point cloud maps a respective content identifier of the plurality of content identifiers to a respective location within the physical space corresponding to a respective signal strength vector of the plurality of signal strength vectors; for each respective point of the point cloud: determine a content identifier having a highest number of occurrences within a predetermined radius of the location of the respective point; and transform the determined content identifier to a category identifier for the location of the respective point, the category identifier identifying a category of items in the plurality of items; generate, based on the category identifier for a current location of a particular mobile device of the plurality of mobile devices and profile data for a particular consumer, a recommendation for a candidate product for the particular consumer to consider, the particular consumer being a user of the particular mobile device, the candidate product belonging to the category of items identified by the category identifier for the current location of the particular mobile device; and transmit a message that causes the particular mobile device to output the recommendation for the candidate product for display.

In another example, this disclosure describes a non-transitory computer readable data storage medium having instructions stored thereon that, when executed, configure a computing system to: receive a plurality of signal strength vectors, each respective signal strength vector of the plurality of signal strength vectors comprising respective indications of signal strengths, as detected by a mobile device of a plurality of mobile devices, of signals emitted by a plurality of beacons located within a physical space; and receive a plurality of content identifiers, each respective content identifier of the plurality of content identifiers identifying content accessed by a mobile device of the plurality of mobile devices, the content corresponding to an item among a plurality of items located within the physical space; generate a point cloud comprising a plurality of points, wherein each respective point of the point cloud maps a respective content identifier of the plurality of content identifiers to a respective location within the physical space corresponding to a respective signal strength vector of the plurality of signal strength vectors; for each respective point of the point cloud: determine a content identifier having a highest number of occurrences within a predetermined radius of the location of the respective point; and transform the determined content identifier to a category identifier for the location of the respective point, the category identifier identifying a category of items in the plurality of items; generate, based on the category identifier for a current location of a particular mobile device of the plurality of mobile devices and profile data for a particular consumer, a recommendation for a candidate product for the particular user to consider, the particular consumer being a user of the particular mobile device, the candidate product belonging to the category of items identified by the category identifier for the current location of the particular mobile device; and transmit a message that causes the particular mobile device to output the recommendation for the candidate product for display.

The details of one or more examples are set forth in the accompanying drawings and the description below. Other features, objects, and advantages of the disclosure will be apparent from the description, drawings, and claims.

DETAILED DESCRIPTION

Figure 1:
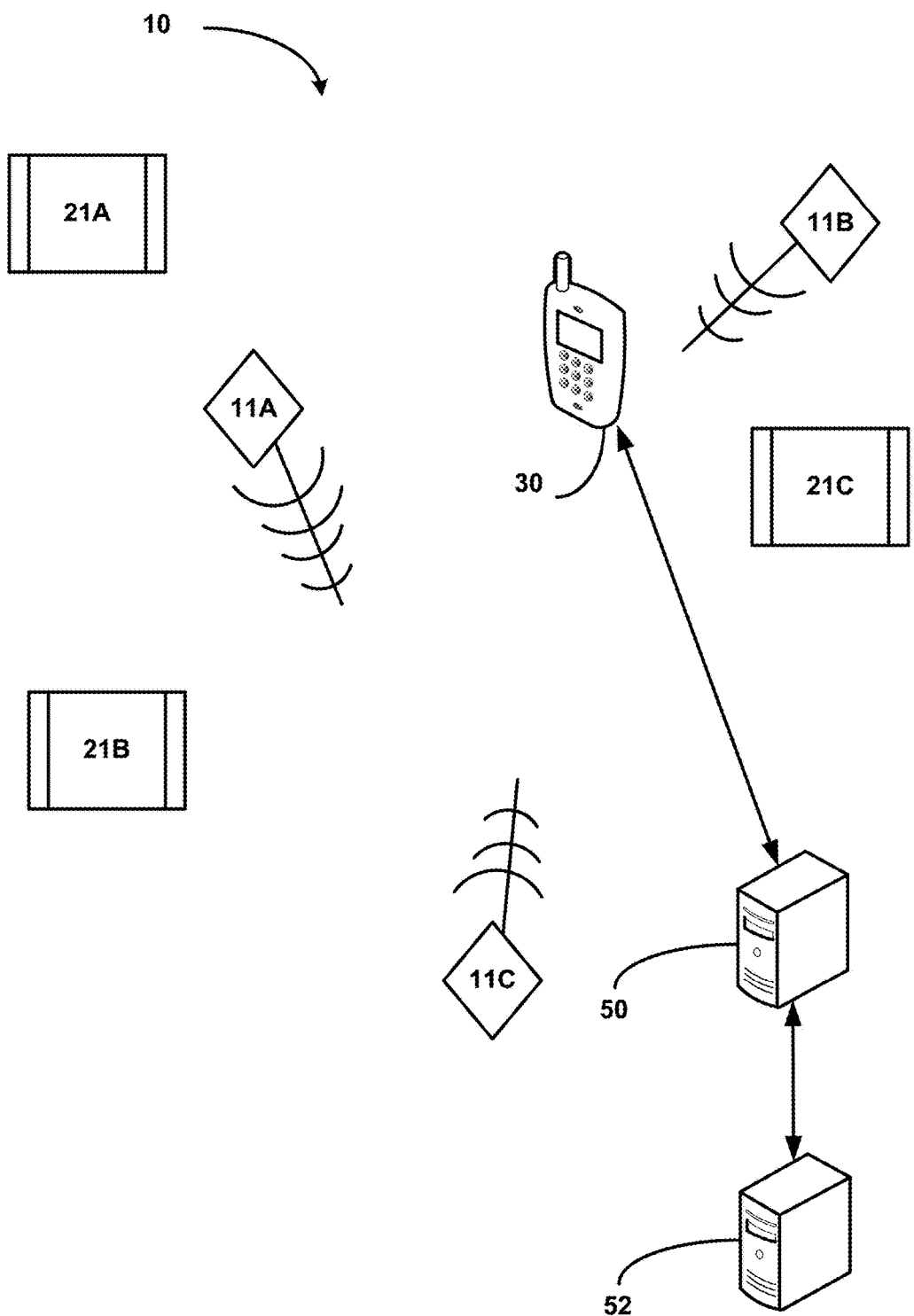
FIG. 1 illustrates an example of a physical space in which elements of a location-based product recommendation system development system are deployed, in accordance with a technique of this disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The terms "mobile device" and "mobile electronic device" refer to a portable computing device including a display, a processor and tangible, computer-readable memory. The device also may include other hardware such as an image capturing device. The memory may contain programming instructions in the form of a software application that, when executed by the processor, causes the device to perform one or image acquisition and processing operations according to the programming instructions. Examples of mobile devices include portable electronic devices such as smartphones (i.e., smart phones), personal digital assistants, cameras, tablet devices, electronic readers, tablet computers, personal computers, media players, satellite navigation devices, and the like.

The term "beacon" refers to a device having a transmitter that emits a signal detectable by a mobile device, so that the mobile device can detect the presence of the beacon. The signal may contain a device identification code, data, or other information. In some examples, a beacon may use a short range communication protocol to transmit its signals, and the mobile device may use the short range communication protocol to detect the signals. Examples of short range communication protocols include various Bluetooth protocols and related protocols such as the Bluetooth Low Energy protocol, other near field communication (NFC) protocols, ZigBee, ANT, ANT+, radio frequency identification (RFID)

and others. Some examples of beacons also may transmit sonic communications or local area wireless signals such as Wi-Fi signals.

A beacon using a "low energy" communication protocol is one with characteristics of being capable of transmitting short data packets for short distances (such as up to 10 meters, up to 25 meters, or in some cases up to 100 meters or more) while consuming very little power. A low energy beacon is typically designed to operate for several years or more on a single standard battery.

The term "floor map" refers to a model of a physical space, in which the model includes data representing locations and descriptive data for various items within the physical space. Examples include a map of a room or section of a retail store, with associated data indicating where various items are located within the room or section. The items may be specific items (such as those associated with a SKU number), general categories of items (such as men's shoes), or items denoted by any combination of general and specific characteristics. In some examples, the floor map may be a signal space representation of a physical space.

The terms "signal space" and "signal-space" may refer to a coordinate system whose position vector includes the signal strength of the beacons within physical space 10. For instance, if there are a total of N beacons within the space, the signal-space position vector includes the measured signal strength of each of the N beacons. When given the Euclidean coordinates of each beacon, there exists a mapping from signal-space to physical three-dimensional Euclidean space.

FIG. 1 illustrates an example of a system for generating a content-based floor map of a physical space 10 and/or for providing location-based product recommendations to a consumer who is present in the area, in accordance with a technique of this disclosure. Although the product recommendation systems may use pre-existing floor maps or other floor map generation systems, this disclosure provides one example of a floor map generation or updating process. Physical space 10 contains various products 21A, 21B, 21C (collectively, "products 21"). Products 21 may include products, such as items sold in a retail store, vendors in a convention center or trade show, stores in a shopping center, activities in an amusement park or other products and settings. For simplicity, when this disclosure refers to a recommendation or advertisement for a "product," this disclosure intends to refer to any such example (e.g., a commercially-available item or a service, a vendor, an activity, etc.). For example, if physical space 10 is a retail store, one group of products 21 may be men's jeans, another group of products 21 may be men's sweaters, and another group of products 21 may be women's sweaters. Other categories and numbers of products are possible. Thus, the term "product recommendation" and similar phrases may include an actual recommendation of a product or service, an advertisement for a product or service, a promotional message for a product or service such as a coupon or discount offer, an order for a task to be performed or a service to be provided at a particular location, or other messaging relating to particular product or service relevant to the location.

Beacons 11A, 11B, 11C (collectively, "beacons 11") are placed at various locations in physical space 10. At least three beacons are represented in the example of FIG. 1 in order to develop a data set, although fewer can be used, and if more are available, mapping can be more precise and/or robust. Beacons 11 may be dispersed throughout physical space 10 so that the set of beacons is collectively proximate to a variety of products in physical space 10.

Each of beacons 11 includes a respective transmitter and emits a respective signal containing a respective unique identifier (ID) for the respective beacon. The identifier may include an alphanumeric identifier or other code including a group identifier portion and a beacon identifier portion. In some examples, the group identifier portion is common to all beacons in a group, such as all beacons in physical space 10, all beacons in a particular section of physical space 10, all beacons deployed by a particular operator in a set of areas or another grouping. The beacon identifier portion may include a code unique to a particular beacon within the group, resulting in an overall unique identifier for each beacon.

Beacons 11 may be considered to be sensor nodes that enable a mobile device 30 to develop a measure of distance from each beacon. Hence, this disclosure may refer to beacons as sensors. A "distance" may include an actual numeric distance, a general category of distance (such as "far," "near" or "immediate"), or a combination of the two. In some examples, mobile device 30 detects a measure of strength of a signal received from a beacon. The signal strength itself may be a measure of distance, in that the more intense the signal strength, the shorter the distance between mobile device 30 and the beacon. One example may use Bluetooth Low Energy beacons, but various examples may leverage various types of communication and/or location sensing technology. In an alternate example, a camera on mobile device 30 captures an image of a beacon, or a camera on a beacon may capture an image of mobile device 30, and a software application may process the image to determine a distance between the beacon and mobile device 30.

As a user moves mobile device 30 throughout physical space 10, a software application running on mobile device 30 may cause mobile device 30 to detect the emitted beacon signals within range and identify a beacon identifier and signal strength for each detected signal. Additionally, mobile device 30 may send this data or a function of this data to a server 50 that stores this data, along with other data discussed elsewhere in this disclosure. Server 50 may be positioned within physical space 10, or server 50 may be a remote server with which mobile device 30 can directly or indirectly communicate via one or more communication networks. Server 50 may include single device as shown, or server 50 may include multiple computing devices collectively performing the functions of server 50 described in this disclosure.

Server 50 may aggregate the stored data with data received from various mobile devices at various times within physical space 10 to develop a floor map of physical space 10. Server 50 or mobile device 30 may do this by correlating beacon identifiers and/or signal strength data with data indicating content the user was viewing on mobile device 30 substantially concurrently with the collection by mobile device 30 of the beacon identifier and signal strength data. Examples of content may include: (i) the address of, or content in, one or more web pages being displayed on mobile device 30; (ii) an item that a native application of an operator of physical space 10 is presenting on mobile device 30; (iii) an image of an item captured by a camera application of mobile device 30; (iv) a barcode captured by a barcode scanning application of mobile device 30; (v) a search query; or (vi) other content.

Server 50 may store this data (i.e. data correlating beacon identifiers and/or signal strength data with content identifiers) in a data storage facility 52. Data storage facility 52 may include one or more computer-readable media holding the data in a database or other data structure. Data storage facility 52, or a portion of data storage facility 52, also may store consumer profile data for multiple mobile device users. Server 50 may use the consumer profile data to generate product recommendations. As noted above, server 50 may include multiple devices. Accordingly, a server that develops the floor map need not necessarily be the same server providing the product recommendations.

Figure 2:
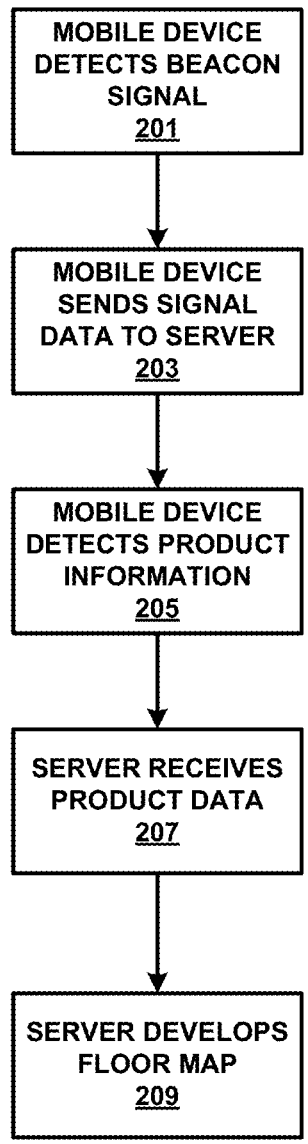
FIG. 2 is a flowchart illustrating various elements of an example of a floor map learning process, in accordance with a technique of this disclosure.

FIG. 2 is a flow diagram illustrating an example of some of the processes described above, in accordance with a technique of this disclosure. The flowcharts of this disclosure are presented as examples. Other examples in accordance with the techniques of this disclosure may include, more, fewer, or different actions. Furthermore, in other examples, the actions of the flowcharts may be performed in different orders or in parallel.

Referring to FIG. 2, various mobile devices, such as mobile device 30, may move within physical space 10 and may detect (201) signals emitted by various beacons 11. When detecting a signal emitted by a beacon, mobile device 30 device may identify, in the signal, a unique identifier corresponding to the beacon, along with a measure of signal strength. Mobile device 30 may send (203) signal data to server 50 for use in developing a floor map of physical space 10. The signal data may include a beacon identifier for the identified beacon and the determined signal strength of the identified beacon.

In the example of FIG. 2, when mobile device 30 detects a signal emitted by a beacon, an application executing on mobile device 30 may cause mobile device 30 to detect (205) product information. For instance, the application executing on mobile device 30 may determine, substantially concurrently with detecting the signal from a beacon, a user of mobile device 30 is using mobile device 30 to access content corresponding to one or more products present in physical space 10. If mobile device 30 uses a software application provided by or associated with an operator of physical space 10, the software application may perform this identification. On the other hand, if mobile device 30 uses an application not associated with the operator, such as a general browsing application or a barcode scanning application), other methods may be used to detect the content accessed by mobile device 30. One example is in the case of a browsing application, where the user may use mobile device 30 to access a web page on which a product is displayed. In this example, an application of mobile device 30, or a server of the web page using a tracking method such as a cookie, may detect mobile device 30 is accessing the web page. Server 50 may access a data store in which web page addresses are associated with web page content, and server 50 may identify a product corresponding to the content for the accessed page. In any of these situations, server 50 may receive (207), either directly via a communication from mobile device 30 or indirectly such as via a third party service provider that detects mobile device 30 is being used to access the content, product data indicating content accessed by mobile device 30. Server 50 may use the product data to develop (209) a content-based floor map of physical space 10.

The term "substantially concurrently," as used above and elsewhere in this disclosure, means at the same time as mobile device 30 is in the location, or within a very short measure of time or distance from the location. For example, times may be considered to be "substantially concurrent" if they are within up to 30 seconds of each other, up to 1 minute of each other, or up to 2 or 3 minutes of each other, or some other short time limit. Locations may be considered to be "substantially concurrent" if the measured signal strengths from various beacons have not changed more than a threshold amount, such as by more than 5%, no more than 10%, no more than 20%, or another relatively small measure. The term "location" is used loosely in this document because it is not necessary to deal with location in the traditional Euclidian sense. For instance, a location can correspond to a higher-dimensional "sensor-space," such as a vector of several sensor signal strengths, where each strength is proportional to distance from a given beacon instead of three components of a Cartesian position vector.

After server 50 has developed a floor map, or even if the floor map has been at least partially developed and is being refined and/or updated, the floor map may be used to deliver personalized, location-based product recommendations to mobile device 30 as mobile device 30 moves throughout physical space 10.

The system may combine location data with personal preference data to provide relevant product recommendations, offers, and other content while the device moves throughout physical space 10. The system may maintain or have access to a set of personal preference data for each individual user. Such a data set may include many possible activities of an individual in relation to a retailer. For example, this data may include or be derived from the person's clicks on a website, in-store locations, clicks on a mobile application, purchases of products, and the like. Many of the person's interactions with a retailer may be saved in the consumer's individual data set for the retailer, and optionally logged with a timestamp.

Personal data may include the person's interactions with the retailer, or other operator of physical space 10, through various channels. Various interactions may be is logged with respect to the person's global identification token, e.g., an email address, and ordered chronologically as interactions are accumulated. For instance, a consumer may click on a baseball hat product while at home browsing a website on the consumer's personal computer. Later, the consumer may come to a physical store and stand in the jeans section. These interactions may be logged in the order of their occurrence for the consumer.

Figure 3:
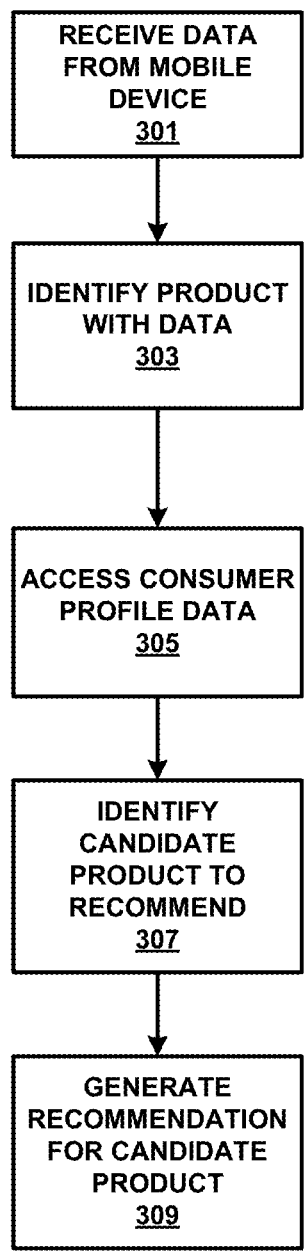
FIG. 3 is a flowchart illustrating various elements of a product recommendation process, in accordance with a technique of this disclosure.

FIG. 3 is a flow diagram illustrating an example of a location-based product recommendation process, in accordance with a technique of this disclosure. Particularly, server 50 may perform the actions of FIG. 3 after or concurrent with the development of the floor map described in FIG. 2. In the example recommendation process of FIG. 3, server 50 receives (301) data (e.g., a communication) from mobile device 30. In the example of FIG. 3, mobile device 30 is associated with a particular consumer. The data received by server 50 may include current product-correlated location information for a space in which mobile device 30 is physically present. Server 50 may receive this data via: (i) a communication directly from mobile device 30; (ii) a separate server such as a third party server that receives information provided by a software application installed on mobile device 30; or (iii) a combination of the two, with some information arriving directly and other information arriving indirectly.

In the example of FIG. 3, the current product-correlated location information may indicate a location of a beacon currently nearest to mobile device 30, a signal strength vector representing a current location of mobile device 30 in signal space based on one or more beacons 11 proximate to mobile device 30, or other data. Server 50 may use the location or the signal strength vector to identify (303) a product, e.g., an item, present in physical space 10 proximate to the current location of mobile device 30, along with a modeled location for the product. In other words, server 50 may correlate the received data with a product. Server 50 may do this by accessing a content-based floor map of physical space 10 and selecting the product that the floor map identifies as closest to the current location of mobile device 30 in the floor map. In other examples, an application on mobile device 30 may use the floor map to identify a modeled location of a product, e.g., item, proximate one or more of beacons 11 in physical space 10, and mobile device 30 may send, in a vector or other data, data indicating the product to server 50.

The data received by server 50 may include at least one of a device ID or a user ID, and server 50 may use the device ID or user ID to identify the particular consumer and access (305) profile data for the particular consumer. Server 50 may use the current product-correlated location information and the profile data for the particular consumer to identify (307) a candidate product to recommend to the particular consumer. In other words, server 50 may use the current product-correlated location information and the profile data for the particular consumer to identify a recommendation for a candidate product for the consumer to consider. Server 50 may then generate (309) a recommendation for the candidate product. In other words, server 50 may generate a message for mobile device 30. When viewed, the message causes mobile device 30 to output the recommendation for the candidate product to the particular consumer.

When generating the recommendation, the system may use any suitable rule set to select the candidate product to recommend. For example, the rules may require the candidate product be the item the particular consumer is viewing on mobile device 30, be an item in the same category as the item the particular consumer is viewing (e.g., if the item is a men's shirt, the candidate product may also be a men's shirt), be an item complementary to the item the consumer is viewing (e.g., if the item is a pair of pants, the candidate product may be a belt that may be worn with the pants), be an item whose category the user has been near for some specified period of time, be an item whose characteristics (for instance: gender, category, color, etc.), are similar to some items the customer has previously viewed, or be otherwise relevant to the item the particular consumer is viewing.

The rules also may require the candidate item be relevant to one or more data points in the particular consumer's profile data. For example, the particular consumer's profile data may include data such as prior consumption activity data of the particular consumer, online browsing activity data of the particular consumer, prior product-correlated location information for the particular consumer when the particular consumer was in a retail space, and/or other data. The system (e.g., server 50) may use both the current product-correlated location information and the particular consumer's profile data to generate the recommendation by selecting a product corresponding to both the item and one or more data points in the profile data for the particular consumer.

In some examples, server 50 combines location data with personal data in a number of possible ways. In a simplistic form, the system (e.g., server 50) may combine location and personal preference in the following way: User location data is transformed into product_ids using the floor map querying process. A pre-specified number of the products returned are logged in the consumer's personal data store with appropriate timestamps. Additionally, a weighting factor proportional to a dwell time of the consumer may also be stored with each of these products. Clicks by the consumer on products on a website (or touches on mobile device 30) are also saved with a timestamp. Other interactions such as purchases clicks on advertisements are stored similarly. This yields a single stream of products. A specified number of the most recent products are passed to a product recommendation algorithm to deliver recommendations incorporating personal history, recency, and/or location. Optionally, a more complex product recommendation algorithm may be used which uses every interaction or substantially every interaction, rather than only a specified number of the most recent interactions, to provide product recommendations. Such systems may weight recent interactions more heavily than long past interactions, but may still persist long past interactions in order to generalize broader persistent user preferences or "tastes." The result of these recommendation processes may be further post-processed/refined using business rules as specified above.

In the discussion above, the term "consumer" is used generally to refer to any mobile device user who may consume, e.g., use, a product, service or activity commercially available in the space. Examples of consumers include shoppers in a retail store, conference attendees at a trade show, ticketed entrants to an amusement park or sporting facility and the like.

Figure 4:
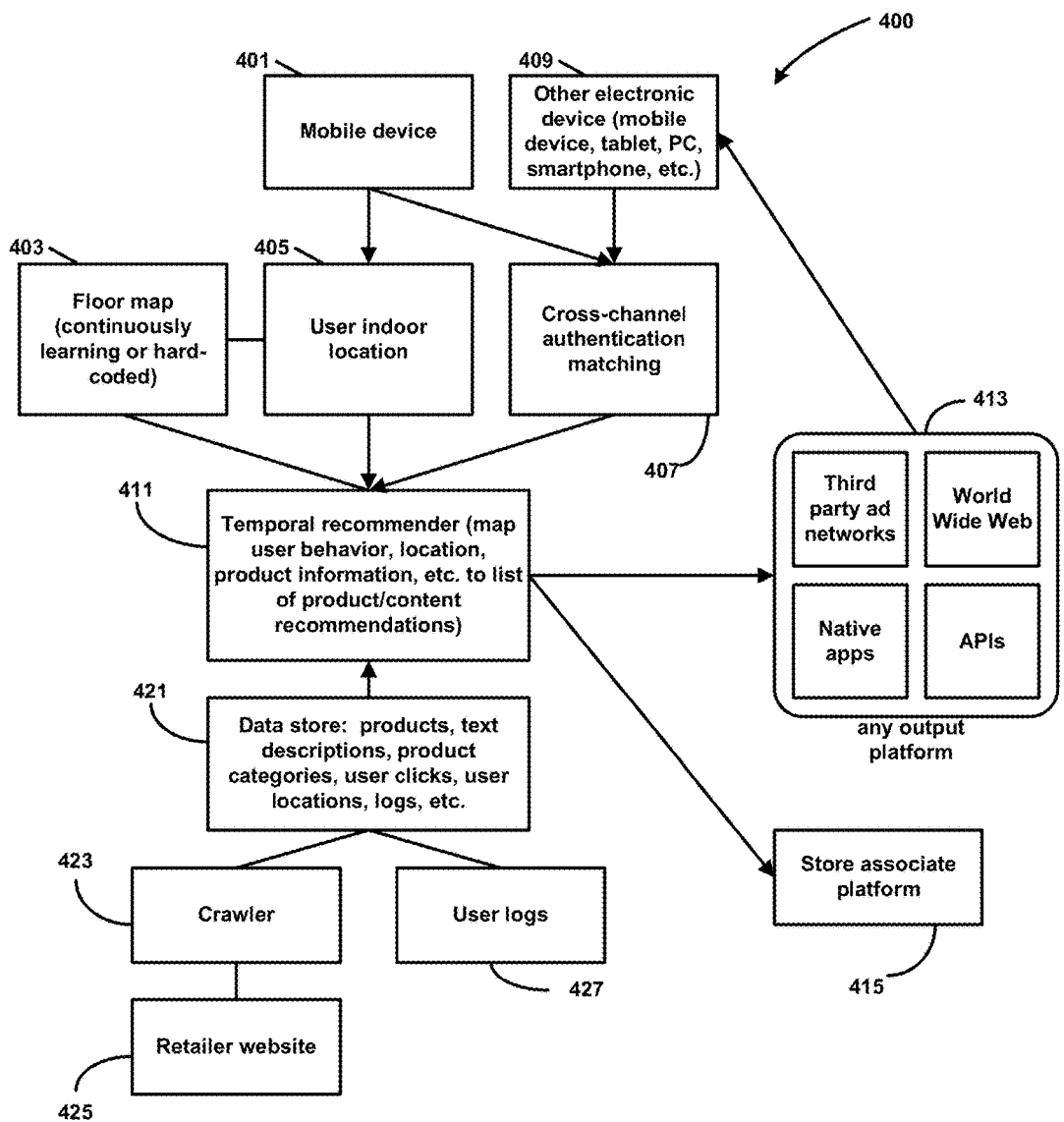
FIG. 4 illustrates various elements of a product recommendation system, in accordance with a technique of this disclosure.

FIG. 4 illustrates additional elements of a system 400 providing location-based recommendations to a consumer, in accordance with a technique of this disclosure. The hub of system 400 is a recommender 411. Recommender 411 includes one or more software modules operating on one or more servers, such as server 50, to generate personalized, location-based recommendations. As described above, recommender 411 may generate recommendations based on a consumer's current or past behavior, device location, product information, or other rules. Recommender 411 may receive, directly from the devices or indirectly via one or more third party services, location information 405 (i.e., a user's indoor location), information about the consumer's mobile device 401, and/or the consumer's other electronic devices 409 (e.g., tablets, personal computers, etc.). Mobile device 401 (e.g., mobile device 30) or recommender 411 may correlate the location information to a floor map 403 providing a model of the locations of one or more items present in a location proximate to mobile device 401. The system also may include a cross channel authentication matching module 407 combining each consumer's activity from multiple devices and/or channels (e.g., a retailer website as viewed on a personal computer, a retailer mobile app, a retailer mobile website, etc.) into a single chronological stream for the user, based on a global authentication token such as an email address.

When a component of system 400, e.g., recommender 411 or mobile device 401, identifies an item proximate to mobile device 401, recommender 411 may access a data store 421 to identify one or more candidate products to recommend to the user of mobile device 401. Data store 421 may include information such as candidate products, text and/or graphic-based descriptions of the products, metadata such as product category information or SKU number. Data store 421 also may contain consumer profile data such as information about locations the consumer has visited, web pages the consumer has viewed, items the consumer accessed via a native software application, consumer preferences and demographics, or other profile data. Data store 421 may obtain this data based on logs of consumer activity 427 (i.e., "user logs") received from the consumer's electronic devices, based on logs of consumer activity received from a third party service provider 425, such as an operator of the facility's website (e.g., a "retailer website"), or based on information obtained from other public sources (or from sources for which the consumer has provided login credentials), such as a crawler 423 such as social media accounts.

In the example of FIG. 4, various output platforms 413 may output, for use by a user of mobile device 401 and other electronic devices 409, product recommendations determined by recommender 411. In the example of FIG. 4, the output platforms 413 may include a third party ad network, the World Wide Web, native applications, and various application programming interfaces (APIs).

The disclosed examples may automatically adapt to changing floor maps. For example, the examples may adapt to change in the location of items or the addition of new items. For instance, a retail floor map changes from time to time for freshening the display of items, as old products are phased out, and as new products are introduced.

To provide contextual and relevant content to mobile device users in real-time as the mobile device users traverse physical space, the system (e.g., server 50) may generate a function, F, mapping a physical location in three dimensions or a signal space representation to a rank ordered list of relevant content in the space. When making product recommendations, the system may incorporate and aggregate user interactions with mobile devices along with localized sensor data in order to learn the function, F. The methods and systems described in this disclosure may be used in fields such as retail (for use in combination with personal preference and business rules to provide product, offer, and content recommendations to shoppers in real-time as they browse a physical retail store), building construction (to present relevant drawings, work orders, tasks, issues, and other pieces of content in the construction or remodeling of buildings), and other fields.

As previously described in this disclosure, the system may use a network of proximity sensor beacons 11 placed around physical space 10. The positioning of beacons 11 need not be exactly uniform with respect to any reference point, but substantially uniform placement may increase robustness of the system.

In one implementation, the system may use radio-based sensors running the Bluetooth Low Energy (BLE) protocol, although other short range communication protocols are possible. For example, the system could use any communication protocol, including but not limited to WiFi, sonic, and photo based systems. Each of beacons 11 may transmit a universally unique identifier (UUID) at constant power, called a "beacon_id" hereafter. As mobile device 30 moves through physical space 10, mobile device 30 may receive the beacon_id and a signal strength power measurement. The power level is inversely proportional to the distance between mobile device 30 and the beacon (e.g., a sensor).

In some examples, the system is multi-tenant and includes tenant and server components. In such examples, the tenant component is a software application running on one or more mobile devices. Hence, this disclosure may refer to the tenant component as "tenant software" or a "tenant application." The tenant software has access to data gathered by sensors of mobile device 30 so that the beacon network can be detected. The tenant software may direct mobile device 30 to transmit detected data to a remote server, such as server 50. In some examples, the tenant software also may include functions enabling a user of mobile device 30 to view information about various products located in the area of beacons 11. For example, the tenant software may be a retailer's product catalog app, a conference manager's attendee information app, or anther app offered by or otherwise associated with an operator of physical space 10 where beacons 11 are placed. In some examples, the tenant software may receive data from other applications installed in mobile device 30, such as the URLs or other identifiers associated with content a web browser application of mobile device 30 accesses.

In some examples, a secondary tenant component executes on one or more non-mobile computing devices with access to the World Wide Web, such as a personal computer. In such examples, the secondary tenant component is a software application executing on the other or more non-mobile computing device. Such an application may not be able to sense its location within an indoor space. However, such an application may use past location data along with user preferences to display product recommendations. This application may also save user interactions to the user's personal profile. An example of such an application is a client-side JavaScript tag on a user's personal computer or laptop Internet browser that logs the user's clicks and purchases of products and sends this data to server 50, while serving product recommendations leveraging recent product-correlated location information from the user's last store visit along with other user preference data to improve recommendation relevance.

Furthermore, a server component is a software application running on a computing device or group of computing devices, such as server 50, accessible via the Internet or another multi-party communication network. Hence, this disclosure may refer to the server component as a "server application." The server application may store at least the most recent locations of user mobile devices, as well as data relating to the content accessed (e.g., viewed) by those mobile devices, and may use the location and content data to learn the floor map. Server 50 also may use mobile device location to fetch contextually relevant content, and may send content directly to mobile device 30 or, alternatively, send content to third party software applications (e.g. advertisement delivery networks) that eventually send relevant content to the user mobile device. Server 50 may combine location data with individual personal preference data in combination with a set of business rules or recommendation algorithm to deliver personally and contextually (i.e., based on location) product recommendations. Server 50 may also have access to secondary data sources such as the store purchase history from a point-of-sale software application.

The system may operate in one of at least two modes. A first mode, referred to as a "discrete" mode, uses the closest beacon or beacons to mobile devices to develop the floor map, update the floor map and/or provide product recommendations. This disclosure may refer to the system, when operating in the "discrete" mode, as being a discrete system. A second mode, referred to as a "continuous" mode, uses a multi-dimensional model for floor map management and/or product recommendation. This disclosure may refer to the system, when operating in the "continuous" mode, as being a continuous system. Examples of each are described below.

In the discrete mode, mobile devices listen to the beacon network. For instance, at points in physical space 10, mobile device 30 determines a vector of (beacon_id, power) tuples from the beacon network. By running the tenant application, mobile device 30 may identify the nearest beacon as the one with the highest detected signal strength. As mobile device 30 moves around physical space 10, mobile device 30 may update, on a set time interval, which of beacons 11 is considered to be the nearest beacon. A separate UUID (in this document referred to as "user_id") may identify the user or user's mobile device. In the discrete mode, when mobile device 30 updates which beacon is considered to be the nearest beacon, the tenant software of mobile device 30 may send a tuple (beacon_id, user_id, timestamp) to server 50. In this tuple, "beacon_id" identifies the beacon mobile device 30 considers to be the nearest beacon and "timestamp" indicates a time.

Users may use mobile devices, such as mobile device 30, in indoor spaces to access many types of digital content, such as webpages, PDFs, coupons, advertisements, and the like. When a mobile device 30 accesses a piece of content, mobile device 30 may send a content identifier, called "content_id" hereafter, identifying the accessed content to server 50 in the form of a (user_id, content_id, timestamp) tuple. The content_id may include a URL, a product_id, or the like. In the discrete mode, server 50 may match the content identifier to a most recent location check-in to generate a (beacon_id, content_id) tuple saved on server 50. In this way, server 50 may log content at the appropriate physical location. If the most recent location check-in was beyond a certain time threshold, such as more than a particular time unit old, server 50 does not match the content to a location in physical space 10.

Server 50 essentially keeps track of a location of mobile device 30 while mobile device 30 is in physical space 10. This may occur in real time based on real-time communications between server 50 and mobile device 30, or on a periodic basis such as when transmissions are periodically pushed or polled between server 50 and mobile device 30. Server 50 also may separately track content viewed on mobile device 30, matching the two at server 50. A reason for this is so that only one tenant application (called "Location App") may track device location rather than every content delivery application (called "Content App") on mobile device 30 also tracking the location of mobile device 30. This may also allow graceful handling of cases in which mobile device 30 intermittently loses its connection to the location network. Furthermore, on certain mobile device operating systems, only certain applications may have access to the operating system (OS) support for sensing a location network. For instance, a native application executing on mobile device 30 may have access to the location services, but a web application running on a mobile browser of mobile device 30 may not. In such a case, the tenant software may run in the background in a native application of mobile device 30 and server 50 may connect content accessed by mobile device 30 with location data, no matter how the user interacts with the content (e.g., via native app, web browser, advertisement, etc.). For example, while the native application runs in the background at mobile device 30, content viewed on a website or clicked on web-based advertisements can be linked with location.

Mobile device 30 may store the set of allowed beacon_ids determined by the tenant application. In some examples, when mobile device 30 nears an area having a network with beacons whose beacon_ids match the allowed beacon_ids, the tenant application begins running in the background on mobile device 30, determining ranges of the beacons. Some operating systems require the user give permission for the tenant application to begin running and may periodically permit the tenant application to continue running in the background on mobile device 30. An allowed beacon_id may be one having, for example, a known group identifier portion.

In one example, the accessed floor map may have data sets correlating content in the facility to the beacon closest to the content. This may be done as a mapping function of (beacon_id, content_id) tuples. This data structure can be used for directing categorical targeted advertisements to the user of mobile device 30. For retail applications for example, the system may correlate various clothing types to proximate beacons as shown in Table 1:

TABLE 1

| Learned Transformed Discrete Floor map | |
|---|---|
| beacon_id | category_id |
| 94328407-B512-4284-872D-FC18DF01B95D_1_1 | men's jeans |
| 94328407-B512-4284-872D-FC18DF01B95D_1_2 | women's sweaters |
| 94328407-B512-4284-872D-FC18DF01B95D_1_3 | men's sweaters |

In some examples, the system adapts over time to changes in the items proximate to each of beacons 11, coming as a result of changes in room layout or changes in room contents (e.g. a retailer changes the layout of products in a store, discontinues some products, or introduces new products).

Up to this point, the system described uses beacons as discrete containers for relevant content. However, in the continuous mode, the system may create a point cloud of content in the continuous sensor-space. A "sensor-space" is a model representing physical space 10 with dimension N, where N is the number of beacons within physical space 10. Each of the N sensors (i.e., beacons) can generate a power output (i.e., a signal of a maximum strength), which is a real number. The N dimensions of signal space are non-orthogonal in comparison to the 3-dimensional vector representing Euclidean space.) In some examples, server 50 creates the point cloud.

The operation of the system in continuous mode may be considered similar in many regards to the "discrete" mode described above, with a few key differences. These differences arise out of the use of the beacons to form a continuous location network. Instead of mobile devices indicating to server 50 the beacons nearest to the mobile devices, the mobile devices may use the detected signal from multiple proximal beacons along with a filter to reconstruction the beacon signal strength vector, which essentially "locates" the mobile devices in so called sensor-space. The continuous form of the system may allow for a greater resolution of relevant content recommendations: each respective point in three-dimensional space (represented in N-dimensional signal-space) has its own, possibly unique, set of content associated with the respective point. Thus, the granularity of the system may approach a limit of granularity of the location network (which is infinite in a true continuous location network), rather than being constrained to N states as in the "discrete" mode of the system.

The continuous system architecture and operation may be similar to the discrete system, except in the ways such as those described below. In the continuous mode, mobile device 30 may determine a signal strength vector. The signal strength vector may indicate strengths of signals of any of beacons 11 within range. Any of beacons 11 out of range may be given a signal strength of zero. Mobile device 30 may use a filter to filter out some of the noise fluctuations in the signal vector. Mobile device 30 may send the signal strength signal vector to server 50 along with a user_id, rather than only sending a beacon_id of a beacon with the strongest signal. This signal strength vector represents the location of mobile device 30 in signal-space. Additionally, similar to the discrete system, mobile device 30 transmits identifiers of content accessed by mobile device 30 to server 50. Server 50 may match the content accessed by mobile device 30 to a most recent signal-space location, if the time since a last location log has not exceeded an adjustable time threshold. This may result in a point cloud of (content_id, [beacon_id, beacon_id, . . . ]) tuples across the signal space, which represents a learned floor map, where "beacon_id" identifies a beacon and a detected strength of a signal of the beacon.

Server 50 or another computing device may pass a filter or transformation function over the point cloud to reduce the data from high-dimensional content-space to a lower dimensional categorical-space representation, which is often more convenient for later use. The operation is similar in purpose to the discrete mode, but the implementation may differ. For instance, server 50 may implement the transformation by applying a convolution integral over sensor-space. For instance, in the case of retail products, assume a convolution function can be applied to each piece of content: the function maps content_id to category_id (men's clothes, women's clothes, shoes, personal health items, etc.). Perform a discrete integral over the point-cloud of content_ids in sensor-space in convolution with a spherical filter function mimicking the statistical mode operator (e.g., (i) take the argmax over all content_ids within a specified radius in signal-space of the number of occurrences of a given content_id; and (ii) transform the content_id to category_id using a metadata database). The resulting function maps sensor-space to product category, essentially yielding a function returning a product category for any point in signal-space. Alternatively, server 50 may use a classification algorithm to partition the space optimally.

In these ways, the system can provide product recommendations by receiving beacon data from mobile devices that move throughout physical space 10, and by correlating the beacon data with products proximate to the mobile devices within physical space 10. The mobile devices detect beacon identifiers transmitted from beacons 11 and may determine a signal strength for each detected unique beacon identifier. The mobile devices may send the detected signal strengths and unique beacon identifiers to server 50 for use in developing a product recommendation. Optionally, applications executing on the mobile devices may transform one or more of these items to a vector representation before sending the data. The mobile devices may repeat the detecting, determining, identifying and sending after the mobile devices move to different locations in physical space 10. Optionally, server 50 may combine location with personal preference data to improve the recommendation relevance.

The previous few paragraphs have described a system and process for learning a floor map. As noted above, the system also may be used to query the floor map and generate product recommendations. For this description, assume mobile device 30 is running at least the following two applications (or one application performs the following two functions):

Location App: measures beacon signal strength and transmits the beacon signal strength to server 50; and Content App: displays content dependent on a location of mobile device 30 and retrieved from server 50 or another source.

In some examples, the functions of these two applications are packaged into a single application. For example, in case of a retailer, the Location App may be the retailer's native shopping application. In this example, the Content App may include the retailer's website as shown on a web browser of mobile device 50, third-party advertisements shown on a website not owned by the retailer, or the retailer's native app (i.e. the native app would serve as both Location App and Content App).

To query a floor map in a discrete system, the Location App may measure beacon signal strength, determine the closest beacon by identifying which detected beacon_id is associated with the highest signal strength, and send this data to server 50. In some examples, server 50 uses the beacon_id to obtain a list of content from a raw floor map (i.e., content other devices have displayed near the beacon identified by the beacon_id). In some examples, server 50 uses a filtered floor map to obtain metadata such as a category_id. Server 50 may transform the metadata into a list of content items using a combination of an outside database and business rules. For instance, given a product category, a web crawl indexing a retailer website may be used to generate a database of product items for each product category. The system may use beacon_id to fetch category_id and category_id to fetch a set of relevant products in the form of content_ids. Server 50 may send the list of content items back to mobile device 30. Server 50 may perform some transformation operation on the content items (e.g. combine with user preferences to filter or score content) before sending back to the Content App on mobile device 30 for display.

To query a floor map in a continuous system, the querying process may operate in a manner similar to the discrete system with at least the following differences. In the continuous mode, the Location App on mobile device 30 may send a signal strength vector to server 50. Filtering may be performed before (on mobile device 30) or after (on server 50). Server 50 obtains data either from a raw floor map, a filtered floor map, or both. In the case of the raw floor map, server 50 may obtain a set of nearest logged pieces of content from the raw floor map. Server 50 de-duplicates the list of content_ids and ranks the de-duplicated list of content_ids by number of occurrences in the original set. In the case of the filtered floor map, server 50 may obtain the category label using the signal strength vector. The remainder of the system operates identically to the discrete system.

When a floor map for an area is available, server 50 may execute programming instructions including one or more business rule systems that determine when, whether and/or how to deliver targeted messaging and content to mobile devices based on category label (category_id). For instance, in retail applications, the filtered floor map may use product category labels to partition the signal-space (continuous) or label the beacons (discrete). A database of targeted messages (e.g., special offers, coupons, web URIs, etc.) may be maintained that maps product categories to content (see Table 2 below). Server 50 may transmit this content to the determined appropriate mobile devices at a determined appropriate times in its course of service. This system can also be joined with other business rules (time-in-store, shopper age, etc.) to further refine content delivery. Thus, a location-based targeted marketing platform is facilitated.

TABLE 2

| Database for targeting content to mobile devices based on category_id | |
|---|---|
| category_id | content to send |
| men's jeans | 10% off jeans offer |
| women's sweaters | Have you seen our jeans? advertisement |
| men's sweaters | Here's a sneak peek at next season's sweaters |

In some examples, server 50 may also maintain or have access to a data storage facility with a database associating location information with the beacon_ids. If so, when the system collects the information from the beacons via mobile devices, the system may use this to create a human-readable floor map. The system may then associate the location data with content viewed on mobile device 30 to add product location data to the human-readable floor map. The system may save this information in one or more data files and present the data to a user, such as a user of mobile device 30 using a tenant application or a content application.

Figure 5:
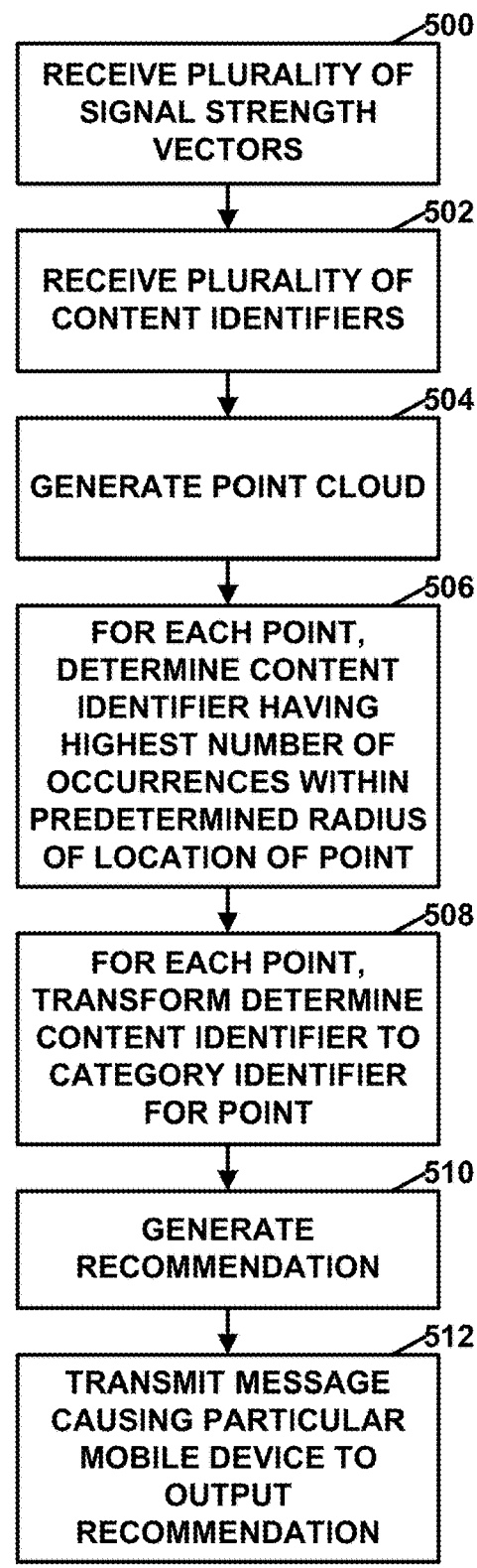
FIG. 5 is a flowchart illustrating an example operation of a computing system, in accordance with a technique of this disclosure.

FIG. 5 is a flowchart illustrating an example operation of a computing system, in accordance with a technique of this disclosure. The operation of FIG. 5 corresponds to a particular continuous mode implementation of the system. In the example of FIG. 5, a computing system receives (500) a plurality of signal strength vectors. Computing system may comprise one or more computing devices. In some examples, the computing system may be server 50. In the example of FIG. 5, each respective signal strength vector of the plurality of signal strength vectors comprises respective indications of signal strengths, as detected by a mobile device of a plurality of mobile devices, of signals emitted by a plurality of beacons located within a physical space. Additionally, the computing system receives (502) a plurality of content identifiers. Each respective content identifier of the plurality of content identifiers identifies content accessed by a mobile device of the plurality of mobile devices. The content corresponds to an item among a plurality of items located within physical space 10. In some examples, the computing system receives a particular signal strength vector from a first application (e.g., a location app) on the particular mobile device and receives a particular content identifier from a different, second application (e.g., a content app) on the particular mobile device. The second application may comprise a web browser application.

Furthermore, in the example of FIG. 5, the computing system generates (504) a point cloud comprising a plurality of points. Each respective point of the point cloud maps a respective content identifier of the plurality of content identifiers to a respective location within the physical space corresponding to a respective signal strength vector of the plurality of signal strength vectors. In some examples, for each respective signal strength vector of the plurality of signal strength vectors, the computing system receives, a respective user identifier for the respective signal strength vector identifying a user of a mobile device that detected the signal strengths of the respective signal strength vector. Additionally, for each respective signal strength vector of the plurality of signal strength vectors, the computing system receives a respective timestamp for the respective signal strength vector. For each respective content identifier of the plurality of content identifiers, the computing system receive, by the computing system, a respective user identifier for the respective content identifier identifying a user of the mobile device that accessed the content identified by the respective content identifier. Furthermore, for each respective content identifier of the plurality of content identifiers, the computing system receives a respective timestamp for the respective content identifier. As part of generating the point cloud, the computer system matches, based on the timestamps and user identifiers for the signal strength vectors and the timestamps and user identifiers of the content identifiers, particular content identifiers of the plurality of content identifiers to particular signal strength vectors of the plurality of signal strength vectors.

For each respective point of the point cloud, the computing system determines (506) a content identifier having a highest number of occurrences within a predetermined radius of the location of the respective point. Furthermore, for each respective point of the point cloud (508), the computing system transforms the determined content identifier to a category identifier for the location of the respective point. The category identifier identifies a category of items in the plurality of items.

In the example of FIG. 5, the computing system generates (510), based on the category identifier for a current location of a particular mobile device (e.g., mobile device 30) of the plurality of mobile devices and profile data for a particular consumer, a recommendation for a candidate product for the particular consumer to consider. In this example, the particular consumer is a user of the particular mobile device. The candidate product belongs to the category of items identified by the category identifier for the current location of the particular mobile device. In some examples, the profile data for the particular consumer comprises one or more of the following: prior consumption activity data of the particular consumer, online browsing activity data of the particular consumer, or prior product-correlated location information for the particular consumer when the particular consumer was in a retail space. In such examples, the computing system generates the recommendation based on the current location of the particular mobile device and at least one of the prior consumption activity data of the particular consumer, the online browsing activity data of the particular consumer, or the prior product-correlated location information for the particular consumer.

In the example of FIG. 5, the computing system transmits (512) a message that causes the particular mobile device to output the recommendation for the candidate product for display. In some examples, the recommendation comprises at least one of: an advertisement for the candidate product, messaging related to the candidate product, a coupon, or a discount offer.

Figure 6:
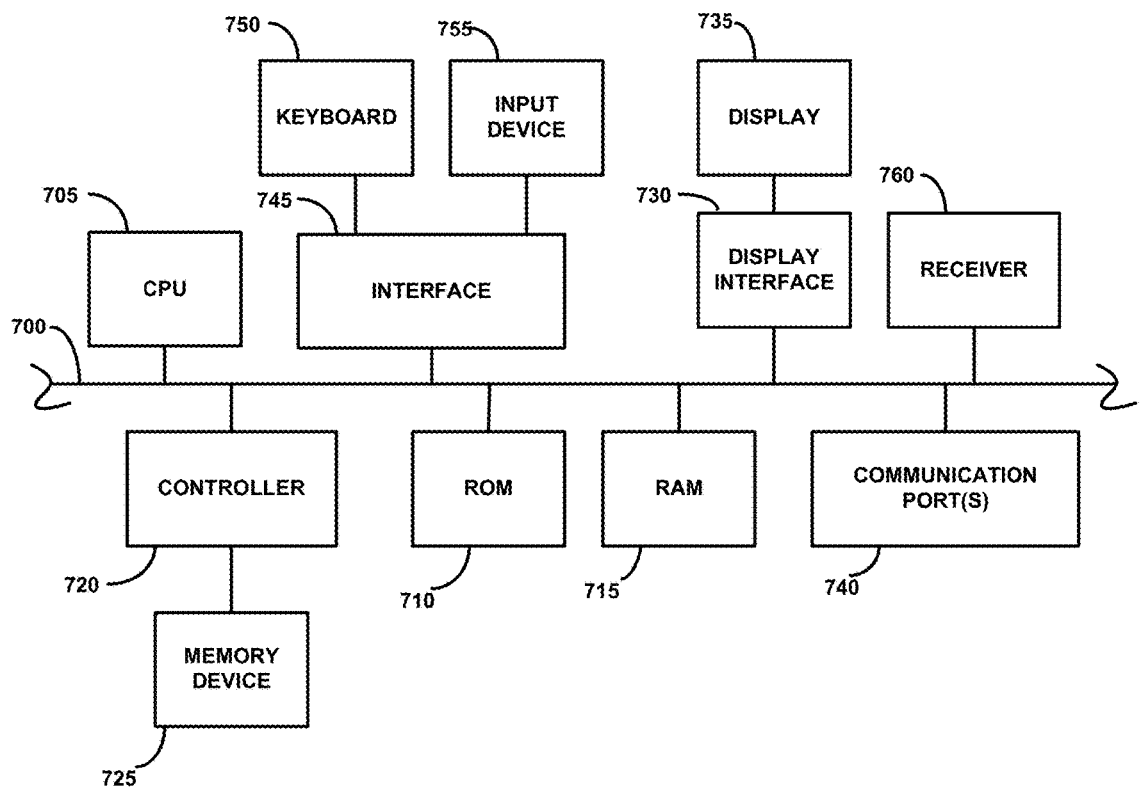
FIG. 6 illustrates an example of various components of an electronic device, such as a mobile device or a computing device providing a function of a server.

FIG. 6 is a block diagram illustrating various elements of an electronic device, such as a mobile device (e.g., mobile device 30) or a computing device performing the functions of a server (e.g., server 50). In the example of FIG. 6, an electrical bus 700 serves as an information highway interconnecting the other illustrated components of the hardware. CPU 705 is a central processing unit of the system, performing calculations and logic operations required to execute a program. CPU 705, alone or in conjunction with one or more of the other elements disclosed in FIG. 6, is a processing device, computing device or processor as such terms are used within this disclosure. Read only memory (ROM) 710 and random access memory (RAM) 715 constitute examples of memory devices.

A controller 720 interfaces with one or more optional memory devices 725 serving as data storage facilities to the system bus 700. Memory devices 725 may include, for example, an external DVD drive or CD ROM drive, a hard drive, flash memory, a USB drive or another type of device serving as a data storage facility. As indicated previously, these various drives and controllers are optional devices. Additionally, memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in ROM 710 and/or RAM 715. In some examples, the program instructions are stored on a tangible non-transitory computer readable medium such as a compact disk, a digital disk, flash memory, a memory card, a USB drive, an optical disc storage medium, a distributed computer storage platform such as a cloud-based architecture, and/or other recording medium.

When used in this document, the term "processor" can refer to a single processor or to multiple processors, such as microprocessors, that together implement various steps of a process. Similarly, a "memory device" or "database" can refer to a single device or databases or multiple devices or databases across which programming instructions and/or data are distributed.

A display interface 730 may permit information from bus 700 to be displayed on display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device. The hardware also may include one or more short range transmission detection devices 760, such as a Bluetooth receiver.

The following are particular example techniques of this disclosure.

Example 1

A location-based product recommendation system, comprising: a data set comprising profile data for a plurality of consumers; a processor; and a server containing programming instructions that, when executed, cause the processor to: receive a communication from a mobile device associated with a first consumer, the communication comprising current product-correlated location information for a space in which the device is physically present, access the profile data for the first consumer, use the current product-correlated location information and the profile data for the first consumer to generate a recommendation for a candidate product for the first consumer to consider, and transmit a message to the mobile device that, when viewed, causes the mobile device to output the recommendation for the candidate product to the first consumer.

Example 2

The system of example 1, wherein: the current product-correlated location information comprises data representing one or more identifiers for one or more beacons in the space, along with a modeled location of an item that is proximate one or more of the beacons in the space; and using the current product-correlated location information to generate the recommendation comprises selecting, as the candidate product, a product that corresponds to the item.

Example 3

The system of example 1, wherein: the current product-correlated location information comprises data representing one or more identifiers for one or more beacons in the space, along with a modeled location of an item that is proximate one or more of the beacons in the space; the profile data for each consumer comprises one or more of the following: prior consumption activity data of the consumer, online browsing activity data of the consumer, or prior product-correlated location information for the consumer when the consumer was in a retail space; and using the current product-correlated location information and the profile data to generate the recommendation comprises selecting, as the candidate product, a product that corresponds to both the item and a data point in the profile data for the first consumer.

Example 4

The system of example 1, further comprising additional programming instructions that, when executed, cause the processor to: receive a session request from the first consumer, wherein the session request originates from an external location that is outside of the space; and when providing a session to the consumer in response to the request, including the recommendation for the candidate product in the session.

The techniques described in this disclosure may be implemented, at least in part, in hardware, software, firmware, or any combination thereof. For example, various aspects of the described techniques may be implemented within one or more processors, including one or more microprocessors, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

The features and function described above, as well as alternatives, may be combined into many other different systems or applications. Various alternatives, modifications, variations or improvements may be made by those skilled in the art, each of which is also intended to be encompassed by the disclosed examples.

The invention claimed is:

1. A method comprising:
updating, by a computing system comprising one or more computing devices, data representing a floor map of a physical space having a plurality of items located within the physical space, comprising:
receiving, by the computing system, a plurality of signal strength vectors, each of the plurality of signal strength vectors comprising respective indications of signal strengths as detected by one of a plurality of mobile devices while present within the physical space, of signals emitted by a plurality of beacons located within a physical space, each of the plurality of signal strength vectors corresponding to one of a plurality of locations within the physical space;
receiving, by the computing system, a plurality of content identifiers, each one of the plurality of content identifiers identifying content accessed by one of the plurality of mobile devices while present in the physical space, the content corresponding to one of the plurality of items located within the physical space;
generating, by the computing system, a point cloud comprising a plurality of points, wherein each of the plurality of points maps one of the plurality of content identifiers to a corresponding one of the plurality of locations within the physical space corresponding to one of the plurality of signal strength vectors; and
for each of the plurality of points of the point cloud:
determining, by the computing system, from among the plurality of content identifiers accessed by the plurality of mobile devices within a predetermined radius of the corresponding location, one of the plurality of content identifiers having a highest number of occurrences; and
transforming, by the computing system, the determined content identifier to a category identifier for the corresponding location, the category identifier identifying a category of items in the plurality of items, and updating the data representing the floor map of the physical space by associating the category identifier with the corresponding location; and
providing a product recommendation to a particular mobile device located within the physical space, comprising:
receiving, by the computing system, a signal strength vector from the particular mobile device;
querying, by the computing device, the data representing the floor map based on the signal strength vector from the particular mobile device and determining therefrom a current location of the particular mobile device within the physical space;
generating, by the computing system, based on the category identifier associated with the current location of the particular mobile device, the product recommendation, the product recommendation corresponding to a product belonging to the category identifier associated with the current location of the particular mobile device; and
transmitting, by the computing system, a message that causes the particular mobile device to output the product recommendation for display on the particular mobile device.

2. The method of claim 1, wherein providing the product recommendation to a particular mobile device located within the physical space further comprises generating the product recommendation based on profile data for a particular consumer, wherein:
the particular consumer is a user of the particular mobile device,
the profile data for the particular consumer comprises one or more of the following:
prior consumption activity data of the particular consumer,
online browsing activity data of the particular consumer, or
prior product-correlated location information for the particular consumer when the particular consumer was in a retail space, and
generating the product recommendation comprises, generating, by the computing system, the product recommendation based on the current location of the particular mobile device and at least one of the prior consumption activity data of the particular consumer, the online browsing activity data of the particular consumer, or the prior product-correlated location information for the particular consumer.

3. The method of claim 1, wherein:
receiving the plurality of signal strength vectors comprises: receiving, by the computing system, a particular signal strength vector from a first application on the particular mobile device; and
receiving the plurality of content identifiers comprises: receiving, by the computing system, a particular content identifier from a different, second application on the particular mobile device.

4. The method of claim 3, wherein the second application comprises a web browser application.

5. The method of claim 1, wherein the product recommendation comprises at least one of: an advertisement for a candidate product, messaging related to the candidate product, a coupon, or a discount offer.

6. The method of claim 1, further comprising:
for each respective signal strength vector of the plurality of signal strength vectors:
receiving, by the computing system, a respective user identifier for the respective signal strength vector identifying a user of the mobile device of the plurality of mobile devices that detected the signal strengths of the respective signal strength vector; and
receiving, by the computing system, a respective timestamp for the respective signal strength vector;
for each respective content identifier of the plurality of content identifiers:
receiving, by the computing system, a respective user identifier for the respective content identifier identifying a user of the mobile device that accessed the content identified by the respective content identifier, and
receiving, by the computing system, a respective timestamp for the respective content identifier; and
wherein generating the point cloud comprises matching, by the computing system, based on the timestamps and user identifiers for the signal strength vectors and the timestamps and user identifiers of the content identifiers, particular content identifiers of the plurality of content identifiers to particular signal strength vectors of the plurality of signal strength vectors.

7. A computing system comprising:
one or more communication ports configured to:
receive a plurality of signal strength vectors, each of the plurality of signal strength vectors comprising respective indications of signal strengths as detected by one of a plurality of mobile devices while present within a physical space, of signals emitted by a plurality of beacons located within the physical space, each of the plurality of signal strength vectors corresponding to one of a plurality of locations within the physical space; and
receive a plurality of content identifiers, each one of the plurality of content identifiers identifying content accessed by one of the plurality of mobile devices while present in the physical space, the content corresponding to one of the plurality of items located within the physical space; and
one or more processors configured to:
generate a point cloud comprising a plurality of points, wherein each of the plurality of points maps one of the plurality of content identifiers to a corresponding one of the plurality of locations within the physical space corresponding to one of the plurality of signal strength vectors; and
for each of the plurality of points of the point cloud:
determine, from among the plurality of content identifiers accessed by the plurality of mobile devices within a predetermined radius of the corresponding location, one of the plurality of content identifiers having a highest number of occurrences; and
transform the determined content identifier to a category identifier for the corresponding location, the category identifier identifying a category of items in the plurality of items, and updating the data representing the floor map of the physical space by associating the category identifier with the corresponding location;
query the data representing the floor map based on a signal strength vector received from a particular mobile device and determine therefrom a current location of the particular mobile device within the physical space;
generate, based on the category identifier corresponding to the current location of the particular mobile device, a product recommendation, the product recommendation corresponding to a product belonging to the category identifier associated with the current location of the particular mobile device; and
transmit a message that causes the particular mobile device to output the product recommendation for display on the particular mobile device.

8. The computing system of claim 7, wherein the one or more processors are further configured to provide the product recommendation to the particular mobile device located within the physical space based on profile data for a particular consumer, wherein:
the particular consumer is a user of the particular mobile device,
the profile data for the particular consumer comprises one or more of the following:
prior consumption activity data of the particular consumer,
online browsing activity data of the particular consumer, or
prior product-correlated location information for the particular consumer when the particular consumer was in a retail space, and
the one or more processors are configured to generate the product recommendation based on the current location of the particular mobile device and at least one of the prior consumption activity data of the particular consumer, the online browsing activity data of the particular consumer, or the prior product-correlated location information for the particular consumer.

9. The computing system of claim 7, wherein the one or more communication ports are configured to:
receive a particular signal strength vector from a first application on the particular mobile device; and
receive a particular content identifier from a different, second application on the particular mobile device.

10. The computing system of claim 9, wherein the second application comprises a web browser application.

11. The computing system of claim 7, wherein the product recommendation comprises at least one of: an advertisement for a candidate product, messaging related to the candidate product, a coupon, or a discount offer.

12. The computing system of claim 7,
wherein the one or more communication ports are configured to:
for each respective signal strength vector of the plurality of signal strength vectors:
receive a respective user identifier for the respective signal strength vector identifying a user of the mobile device of the plurality of mobile devices that detected the signal strengths of the respective signal strength vector; and
receive a respective timestamp for the respective signal strength vector;
for each respective content identifier of the plurality of content identifiers;
receive a respective user identifier for the respective content identifier identifying a user of the mobile device that accessed the content identified by the respective content identifier, and
receive a respective timestamp for the respective content identifier; and
wherein the one or more processors are configured to match, based on the timestamps and user identifiers for the signal strength vectors and the timestamps and user identifiers of the content identifiers, particular content identifiers of the plurality of content identifiers to particular signal strength vectors of the plurality of signal strength vectors.

13. A non-transitory computer readable data storage medium having instructions stored thereon that, when executed, configure a computing system to:
update data representing a floor map of a physical space having a plurality of items located within the physical space, including:
receive a plurality of signal strength vectors, each of the plurality of signal strength vectors comprising respective indications of signal strengths as detected by one of a plurality of mobile devices while present within the physical space, of signals emitted by a plurality of beacons located within a physical space, each of the plurality of signal strength vectors corresponding to one of a plurality of locations within the physical space;

receive a plurality of content identifiers, each one of the plurality of content identifiers identifying content accessed by one of the plurality of mobile devices while present in the physical space, the content corresponding to one of the plurality of items located within the physical space;

generate a point cloud comprising a plurality of points, wherein each of the plurality of points maps one of the plurality of content identifiers to a corresponding one of the plurality of locations within the physical space corresponding to one of the plurality of signal strength vectors; and for each of the plurality of points of the point cloud:
determine, from among the plurality of content identifiers accessed by the plurality of mobile devices within a predetermined radius of the corresponding location, one of the plurality of content identifiers having a highest number of occurrences; and transform the determined content identifier to a category identifier for the corresponding location, the category identifier identifying a category of items in the plurality of items, and updating the data representing the floor map of the physical space by associating the category identifier with the corresponding location; and provide a product recommendation to a particular mobile device located within the physical space, including:
receive a signal strength vector from the particular mobile device;

query the data representing the floor map based on the signal strength vector from the particular mobile device and determining therefrom a current location of the particular mobile device within the physical space;

generate, based on the category identifier associated with the current location of the particular mobile device, the product recommendation, the product recommendation corresponding to a product belonging to the category identifier corresponding to the current location of the particular mobile device; and transmit a message that causes the particular mobile device to output the product recommendation for display on the particular mobile device.

14. The non-transitory computer readable data storage medium of claim 13, wherein the instructions further configure the computing system to generate the product recommendation based on profile data for a particular consumer, wherein:

the particular consumer is a user of the particular mobile device, the profile data for the particular consumer comprises one or more of the following:
prior consumption activity data of the particular consumer,
online browsing activity data of the particular consumer, or
prior product-correlated location information for the particular consumer when the particular consumer was in a retail space, and the instructions configure the computing system to generate the product recommendation based on the current location of the particular mobile device and at least one of the prior consumption activity data of the particular consumer, the online browsing activity data of the particular consumer, or the prior product-correlated location information for the particular consumer.

15. The non-transitory computer readable data storage medium of claim 13, wherein the instructions configure to computing system to:
receive a particular signal strength vector from a first application on the particular mobile device; and
receive a particular content identifier from a different, second application on the particular mobile device.

16. The non-transitory computer readable data storage medium of claim 15, the second application comprising a web browser application.

17. The non-transitory computer readable data storage medium of claim 13, wherein the product recommendation comprises at least one of: an advertisement for a candidate product, messaging related to the candidate product, a coupon, or a discount offer.

18. The non-transitory computer readable data storage medium of claim 13, wherein the instructions configure the one or more processors to:
for each respective signal strength vector of the plurality of signal strength vectors:
receive a respective user identifier for the respective signal strength vector identifying a user of the particular mobile device of the plurality of mobile devices that detected the signal strengths of the respective signal strength vector; and
receive a respective timestamp for the respective signal strength vector;
for each respective content identifier of the plurality of content identifiers:
receive a respective user identifier for the respective content identifier identifying a user of the particular mobile device that accessed the content identified by the respective content identifier, and
receive a respective timestamp for the respective content identifier; and
match, based on the timestamps and user identifiers for the signal strength vectors and the timestamps and user identifiers of the content identifiers, particular content identifiers of the plurality of content identifiers to particular signal strength vectors of the plurality of signal strength vectors.

19. The method of claim 1, wherein the product recommendation is associated with commercially-available item, a service, a vendor, or an activity.

* * * * *